(12) United States Patent
Bock et al.

(10) Patent No.: US 7,073,794 B2
(45) Date of Patent: Jul. 11, 2006

(54) LEAK DETECTION MEANS

(75) Inventors: Eberhard Bock, Mörlenbach (DE);
Erich Prem, Hemsbach (DE); Rolf Vogt, Oftersheim (DE)

(73) Assignee: Carl Freudenberg KG, Weinheim (DE)

( * ) Notice: Subject to any disclaimer, the term of this patent is extended or adjusted under 35 U.S.C. 154(b) by 6 days.

(21) Appl. No.: 10/802,671

(22) Filed: Mar. 17, 2004

(65) Prior Publication Data

US 2004/0232620 A1 Nov. 25, 2004

(30) Foreign Application Priority Data

Apr. 1, 2003 (DE) ................. 103 14 923

(51) Int. Cl.
*F16J 15/00* (2006.01)
(52) U.S. Cl. ...................................... 277/320
(58) Field of Classification Search ................ 277/320; 73/46, 49.1, 49.2; 340/605
See application file for complete search history.

(56) References Cited

U.S. PATENT DOCUMENTS

| 4,672,366 A * | 6/1987 | Butts .......................... 588/260 |
| 4,922,232 A * | 5/1990 | Bosich ....................... 340/605 |
| 5,172,730 A * | 12/1992 | Driver ........................ 138/104 |
| 2003/0015840 A1* | 1/2003 | Davis ......................... 277/320 |
| 2004/0065051 A1* | 4/2004 | Patterson et al. ............. 53/432 |

FOREIGN PATENT DOCUMENTS

DE 10061111 7/2002

\* cited by examiner

*Primary Examiner*—Hezron Williams
*Assistant Examiner*—Paul M. West
(74) *Attorney, Agent, or Firm*—Harness, Dickey & Pierce, P.L.C.

(57) ABSTRACT

A sealing arrangement for sealing a machine element, preferably a shaft, with a sealing ring and leak-detection means that comprises a sensor for detecting the leak, and a depot for picking up the leak. The depot is monitored by the sensor and the depot consists of an absorbent and/or swellable material, and is arranged so as to permit delayed leak detection by the sensor.

12 Claims, 9 Drawing Sheets

LEAK DETECTION MEANS

CROSS-REFERENCE TO RELATED APPLICATIONS

This application claims the benefit of German Patent Application 103 14 923.6, filed Apr. 1, 2003. The disclosure of the above application is incorporated herein by reference.

FIELD OF THE INVENTION

The invention relates to a leak-detection means.

BACKGROUND OF THE INVENTION

Various seals are known for sealing shaft passages. Radial shaft sealing rings, slide-ring seals and the like are widespread, and their use areas are considerable. A common aspect of all seals is that they are subject to wear, and once the seal has lost its sealing function it must be replaced. Leaks occurring in such cases must be prevented, because a leak can cause major damage in many applications. Hence, the need exists for timely detection of an undesirable leak of a liquid or a gas so that the defective seal may be replaced.

A system for detecting leaks at a seal is known from DE 100 61 111 A1. The leak-detection system described therein comprises a depot for storing the leaked material and a sensor based on an optical principle. The sensor provides a signal when the optical properties of the depot have changed as a result of the depot being covered by the leaked liquid.

The size of the leak required to trigger signaling by the sensor depends on the positioning of the sensor in a space, namely on the orientation of the sensor in the space. Although the sensor's orientation can be pre-established at the time of installing a machine element into the machine unit, it cannot be ensured. The sensor will give a signal even for small, transient leaks that can occur when a foreign body passes through the sealing lip.

SUMMARY OF THE INVENTION

The object of the invention is to provide a sensor that, independently of its spatial orientation, shows similar sensitivity and that transient leaks are not detected.

According to principles of the invention, this objective is reached by providing a sealing arrangement for sealing a machine element, preferably a shaft, with a sealing ring and leak-detection means that includes a sensor for detecting the leak and a depot for picking up the leak. The depot is monitored by the sensor, and consists of an absorbent and/or swellable material. Further, the depot is arranged so that a delayed leak detection by the sensor is possible.

By means of an absorbent and/or swellable leak-absorbing depot, and by an arrangement of the depot that permits delayed detection, the leak is distributed uniformly over the depot so that, during leak absorption, a delayed detection is provided regardless of the positioning of the sensor.

The depot preferably consists of an absorbent annular disk. The annular shape permit optimum utilization of the available space.

In an advantageous embodiment, the depot is centered in the leak-detection means by a ring-shaped circumferential bulge. The centering ensures that the depot will fit closely over the entire periphery of the machine element to be sealed, for example a shaft, and that it will absorb the leak.

The depot can be made of a nonvowen material. Such materials are inexpensive and readily processed.

In an advantageous embodiment, the sensor is fastened on a carrier plate. By placing the sensor on a carrier plate, it is possible to position the sensor in a definite orientation in the seal arrangement.

The depot and/or the carrier plate with the sensor can be disposed in a supporting ring. By placement in a supporting ring, the depot and/or the carrier plate with the sensor can be installed as a unit which facilitates their installation.

In an advantageous embodiment, the carrier plate is sustained by a groove located peripherally on the side of the axial leg of the supporting ring facing the shaft. With the aid of the groove connection, a sealing ring is fastened in the supporting ring safely and in a fixed position.

With a spacer, the sensor can be positioned at a distance from the depot. Optical sensors, for example reflected-light barriers, because of the manner in which they function, require a minimum distance from the depot being monitored. This minimum distance is ensured by the spacer.

In another advantageous embodiment, the sealing ring and the supporting ring form an intermediate space for receiving the leaked material. This space picks up a transient leak, for example one induced by a foreign body passing through the seal gap. Because the leak is picked up in the intermediate space, the absorption of the leak by the depot and the signaling by the sensor are delayed. In this manner, it is possible to avoid increased maintenance costs due to a premature replacement of the sealing ring and to idle periods.

An annular element made of an absorbent material is preferably disposed in the intermediate space. With the aid of the absorbent material, the entire annular space can be utilized as a depot. As a result, the absorption capability of the depot is increased, and the absorption by the depot and the signaling by the sensor can be further delayed compared to a space devoid of absorbent material.

In another embodiment, an annular disk made of absorbent material is disposed on the sealing ring on the side facing the surroundings, the disk being positioned ahead of the leak-detection means. The disk makes it possible to pick up a transient leak. Signaling is thus further delayed.

The sealing ring can be inserted into the supporting ring. By disposing the sealing ring in a supporting ring, the sealing ring and the leak-detection means can be installed into a unit as a single component.

In another embodiment, with the aid of the supporting ring, the leak-detection means are disposed in a recess located on the outer periphery of the sealing ring. The recess ensures a firm seat for the supporting ring and the centering of the leak-detection means in the sealing ring.

Preferably, an elastomeric covering of the supporting ring is provided in the direction of the surroundings with at least one sealing lip which rests on the shaft in a sealing manner, or is disposed at a small distance therefrom. The sealing lip protects the leak-detection means against dirt particles from the surroundings.

In one embodiment, the sensor detects optical changes of the depot. Optical sensors permit contact-free measurements.

The sensor can be formed by a reflected infrared light barrier.

In another embodiment, the sensor consists of a mechanical system that detects volume changes of the depot.

In another embodiment, a change in dielectric properties of the depot is used to sense a leak. In this embodiment, the depot is disposed between two condenser plates consisting, for example, of the supporting rings for the sealing ring and the leak-detection means, or of layers of conductive materials applied to both sides of the depot. The absorption of the leak changes the dielectric properties of the depot, and this is detected by the sensing device. The condenser plates can have the same dimensions as the depot or they can consist of one or more smaller segments.

Signal transmission from the sensor can take place without a cable. In this embodiment, the cable passage, and the sealing thereof in the housing, can be omitted.

Signal transmission from the sensor preferably takes place through a round or flat strip cable. Signal transmission via cable can be provided in a simple and inexpensive manner.

In an advantageous embodiment, the flat strip cable passes through a cable passage lined with an elastomer. The elastomer ensures the tight sealing of the cable passage.

The elastomer of the cable passage can be adhesively connected with the flat strip cable.

Preferably, the supporting ring is provided with an elastomeric layer on the outer periphery of its axial leg. The elastomeric layer ensures the static sealing of the system in the direction of the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
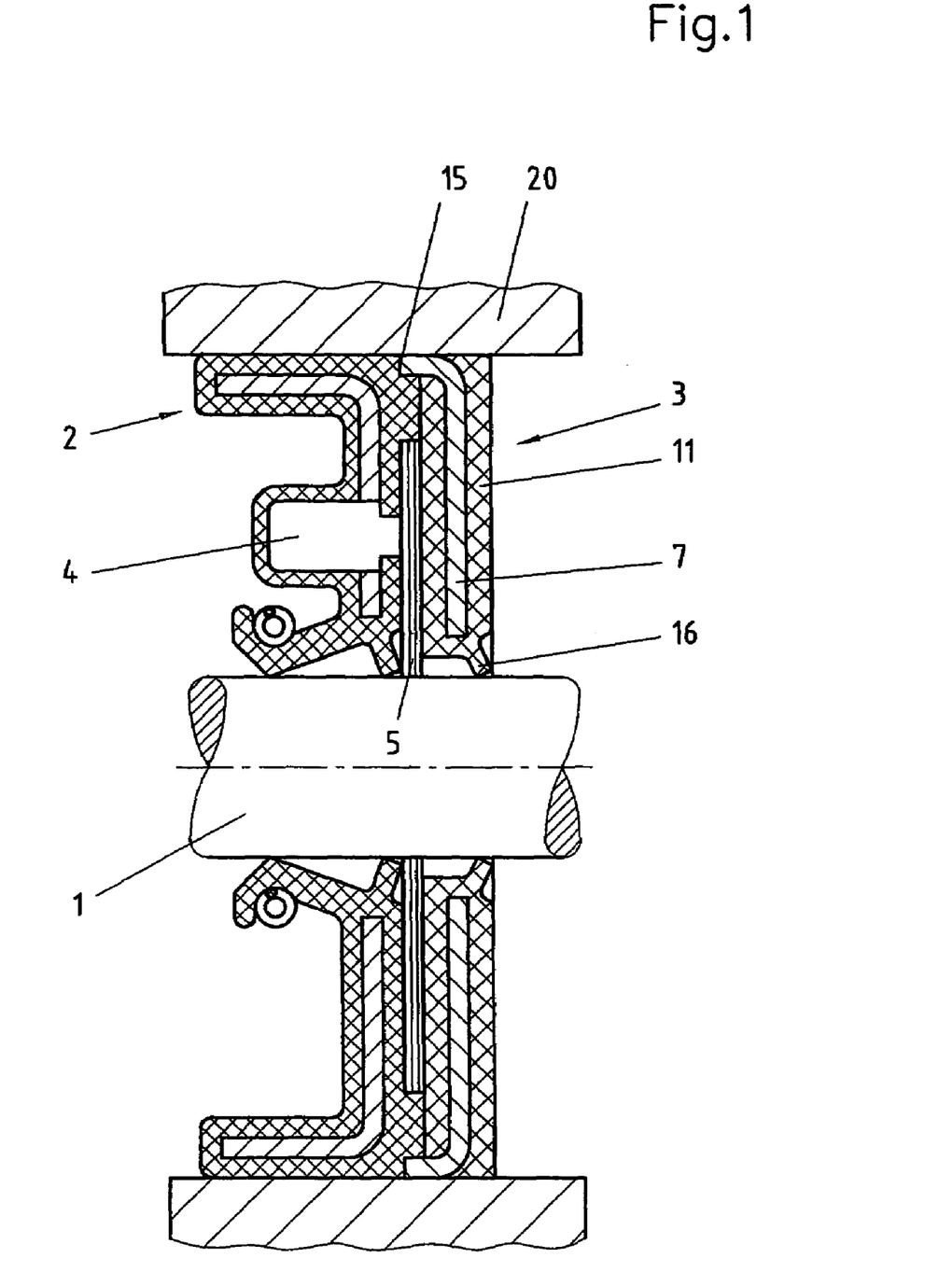
FIG. 1 is a longitudinal cross-sectional view of a sealing ring according to a principle of the present invention.

FIG. 1 shows a sealing arrangement with a sealing ring 2, which in this embodiment is a radial shaft sealing ring, and leak-detection means 3. Leak-detection means 3 comprises a metallic supporting ring 7 with an axial and a radial leg. An elastomeric layer 11 is vulcanized onto both sides of the radial leg, with the layer 11 forming a sealing lip 16 that rests in sealing manner on a shaft 1 that is to be sealed. The supporting ring 7 is fastened in a recess 15 disposed on the outer periphery of sealing ring 2 and faces a housing 20. Between the sealing ring 2 and the elastomeric layer 11 of supporting ring 7 is located a depot 5 consisting of an absorbent material and intended to absorb a leak. A sensor 4 is disposed in an elastomeric layer of sealing ring 2, with the front of the sensor 4 being capable of touching depot 5.

Figure 2:
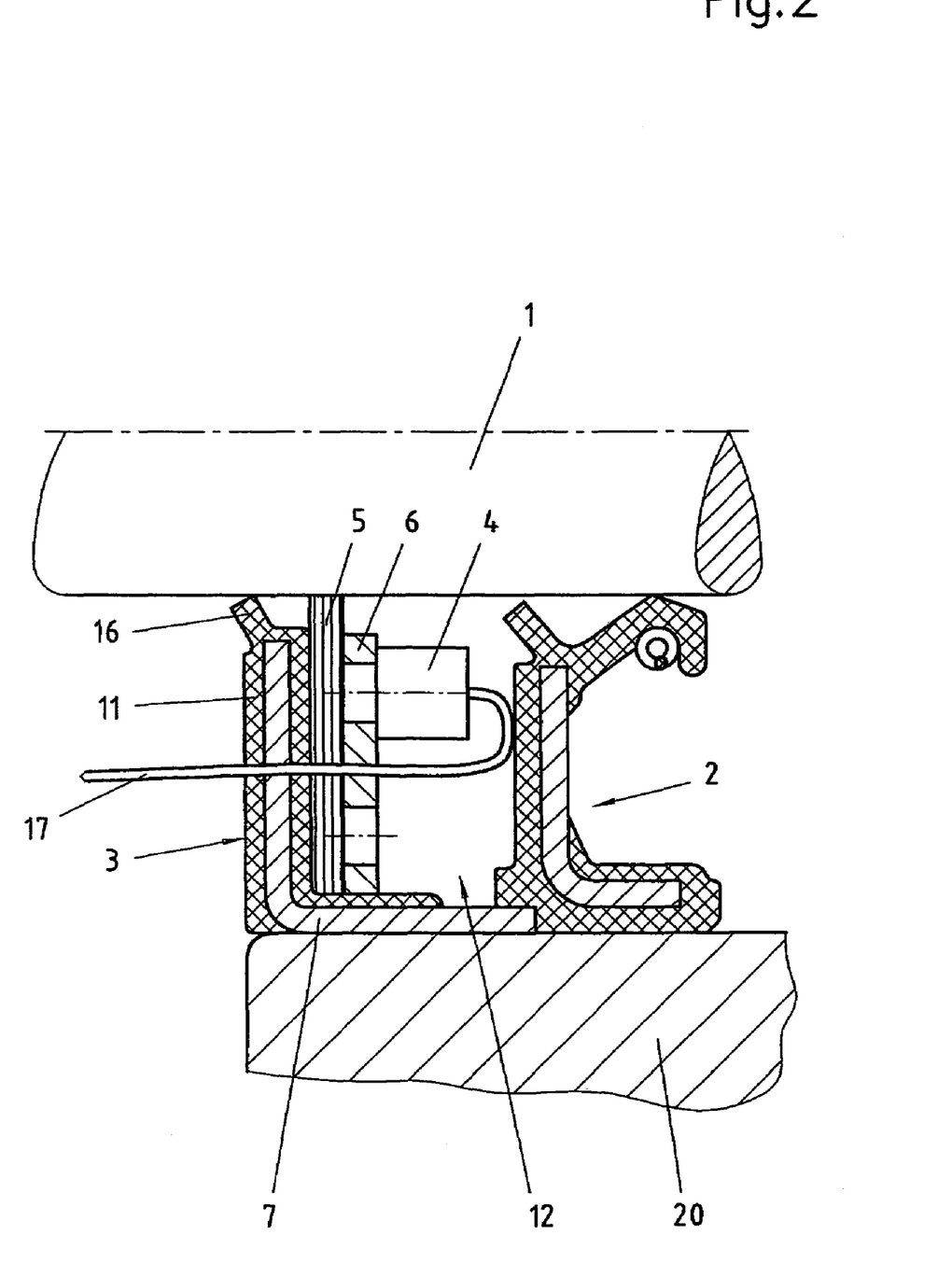
FIG. 2 shows a sealing ring with an intermediate space for absorbing a leak according to a principle of the present invention.

FIG. 2 shows a sealing arrangement wherein the axial leg of supporting ring 7 of the leak-detection means 3 is longer so that an intermediate space 12 is formed between sealing ring 2 and the radial leg of supporting ring 7. The space 12 is intended to take up a leak. Sensor 4 is mounted on a carrier plate 6. Carrier plate 6 is centered in the axial leg of supporting ring 7. Carrier plate 6 is provided with holes distributed over the periphery and through which a leak can enter depot 5. A signal of sensor 4 is transmitted outward through a flat strip cable 17.

Figure 3:
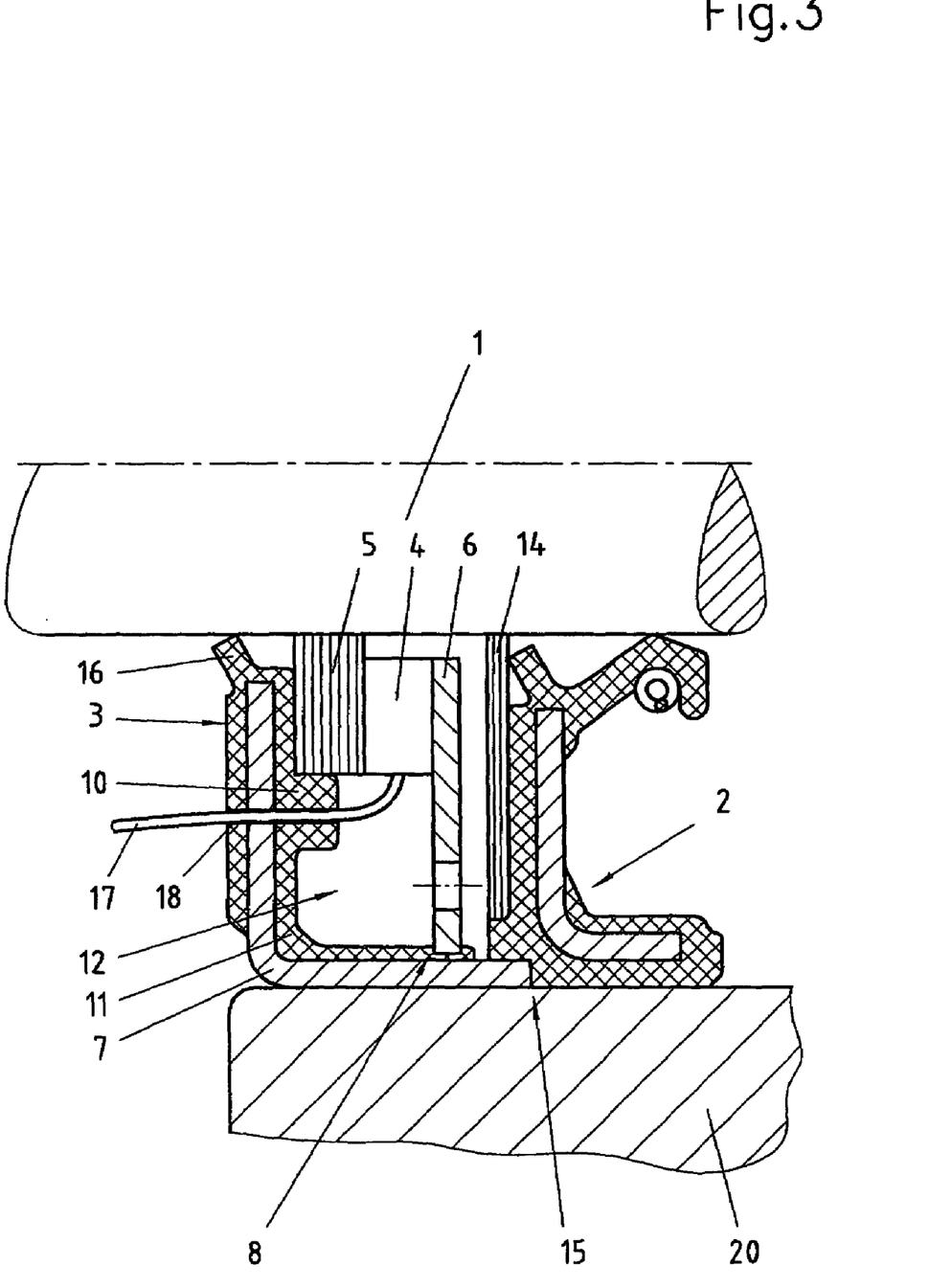
FIG. 3 shows a sealing ring with a leak-absorbing disk mounted ahead of it according to a principle of the present invention.

FIG. 3 shows a sealing arrangement wherein a disk 14 made of absorbent material rests directly on the side of sealing ring 2 facing intermediate space 12. Disk 14 is mounted ahead of intermediate space 12 and depot 5, and is intended for absorption of a transient leak. Depot 5 is centered by a ring-shaped bulge 10 formed by elastomeric covering 11 of the radial leg of supporting ring 7. Carrier plate 6, to which sensor 4 is fastened, is sustained by a groove 8 disposed on the side of and surrounding the axial leg of supporting ring 7 that faces shaft 1. The signal from sensor 4 is transmitted outward through flat strip cable 17 running through cable passage 18. Cable passage 18 consists of an elastomeric material and is connected with flat strip cable 17.

Figure 4:
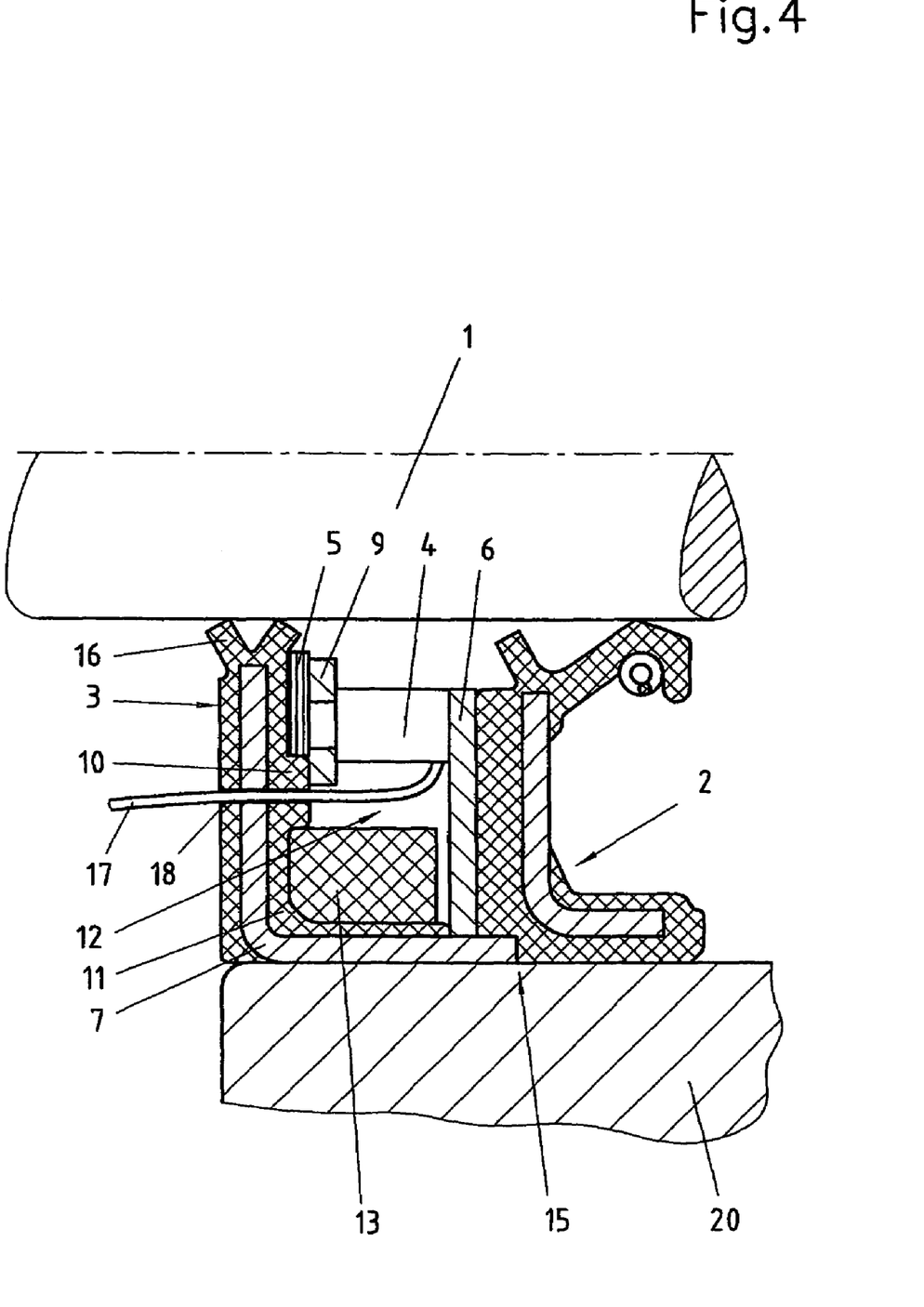
FIG. 4 shows a sealing ring with a ring of absorbent material introduced into an intermediate space and which is provided with a spacer for positioning the sensor according to a principle of the present invention.

FIG. 4 shows a sealing arrangement wherein a ring 13 made of absorbent material is disposed in intermediate space 12. This ring picks up a leak and, by its absorbency, distributes the leak over the entire intermediate space 12. Sensor 4 is mounted on a carrier plate 6 and, by a spacer 9, is kept at a certain distance from depot 5. The elastomeric layer 11 of the radial leg of the supporting ring 7 forms, in the direction of a machine element to be sealed, two sealing lips 16 disposed in the form of a "v" relative to each other and resting on the shaft. The annular space thus created is filled with a lubricant.

Figure 5:
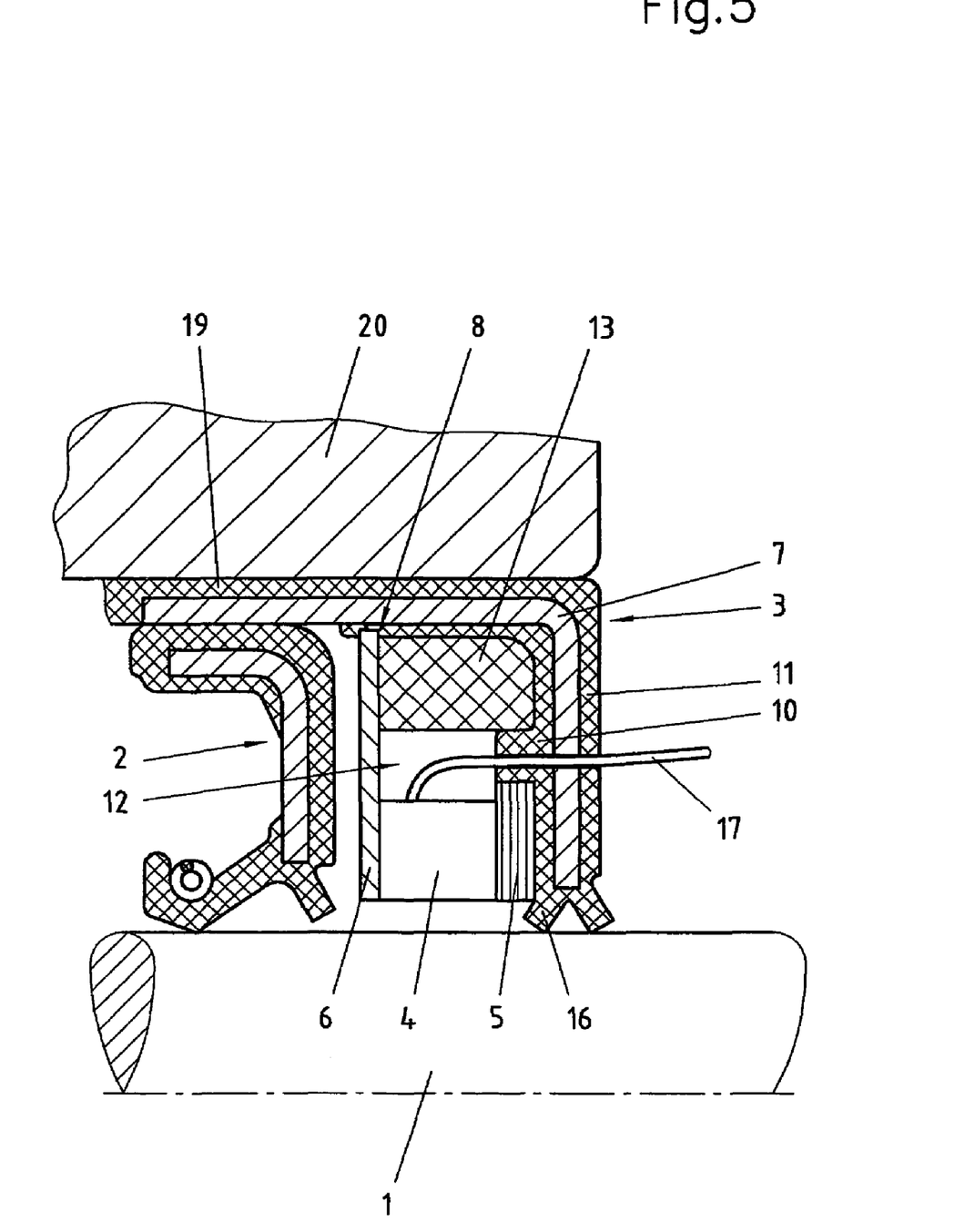
FIG. 5 shows a sealing ring with a ring of absorbent material disposed in the intermediate space according to a principle of the present invention.

FIG. 5 shows a sealing arrangement wherein sealing ring 2 is disposed in supporting ring 7 of the leak-detection means 3. In this manner, it is possible to install sealing ring 2 and leak-detection means 3 as a unit. The axial leg 7 of supporting ring 7 is provided on its outer periphery 19 completely and, on its inside 10 partly, with an elastomeric layer. Outer layer 19 ensures the static tightness of the sealing arrangement toward housing 20. A surrounding groove 8, sustained by carrier plate 6, is disposed in layer 10 which is present in sections on the inside of supporting ring 7.

Figure 6:
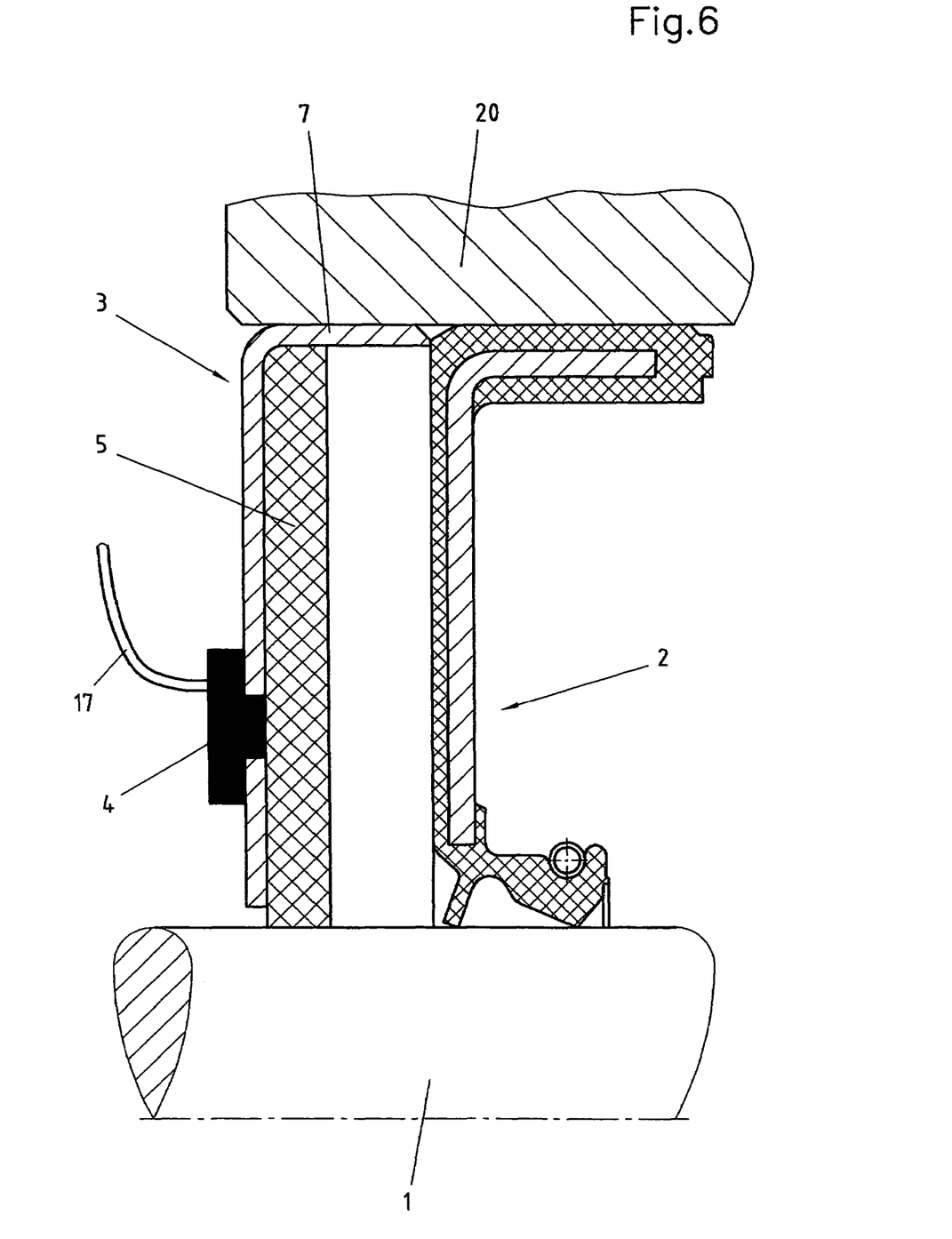
FIG. 6 shows a sealing ring with a supporting ring and a disk for leak pickup according to a principle of the present invention.

FIG. 6 shows a sealing arrangement with a standard radial shaft sealing ring 2 and leak-detection means 3. Depot 5, made of absorbent nonvowen material, rests on and in contact with shaft 1, wherein its function is to pick up the leaked liquid, while at the same acting as a protective seal against dust to protect sealing ring 2 against dirt from the surroundings. Sensor 4 is disposed on the side of supporting ring 7 and faces the surroundings. The signal transmission occurs via cable 17.

Figure 7:
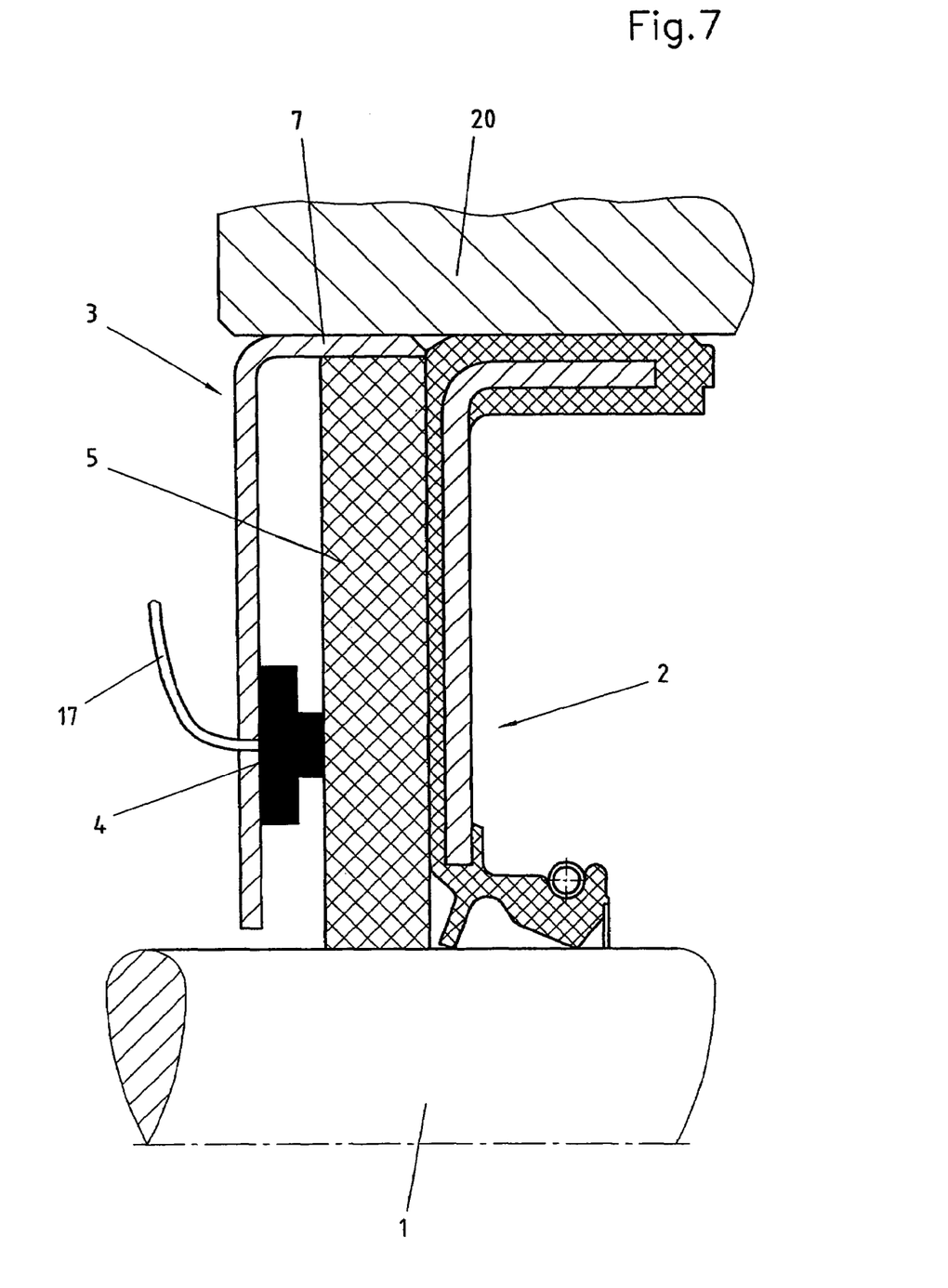
FIG. 7 shows a sealing ring with a supporting ring and a disk for leak pickup according to a principle of the present invention.

FIG. 7 shows a practical example of the sealing arrangement shown in FIG. 6, wherein sensor 4 is disposed in the space between sealing ring 2 and supporting ring 7. In this example, the sensor 4 is protected from mechanical damage from its surroundings.

Figure 8:
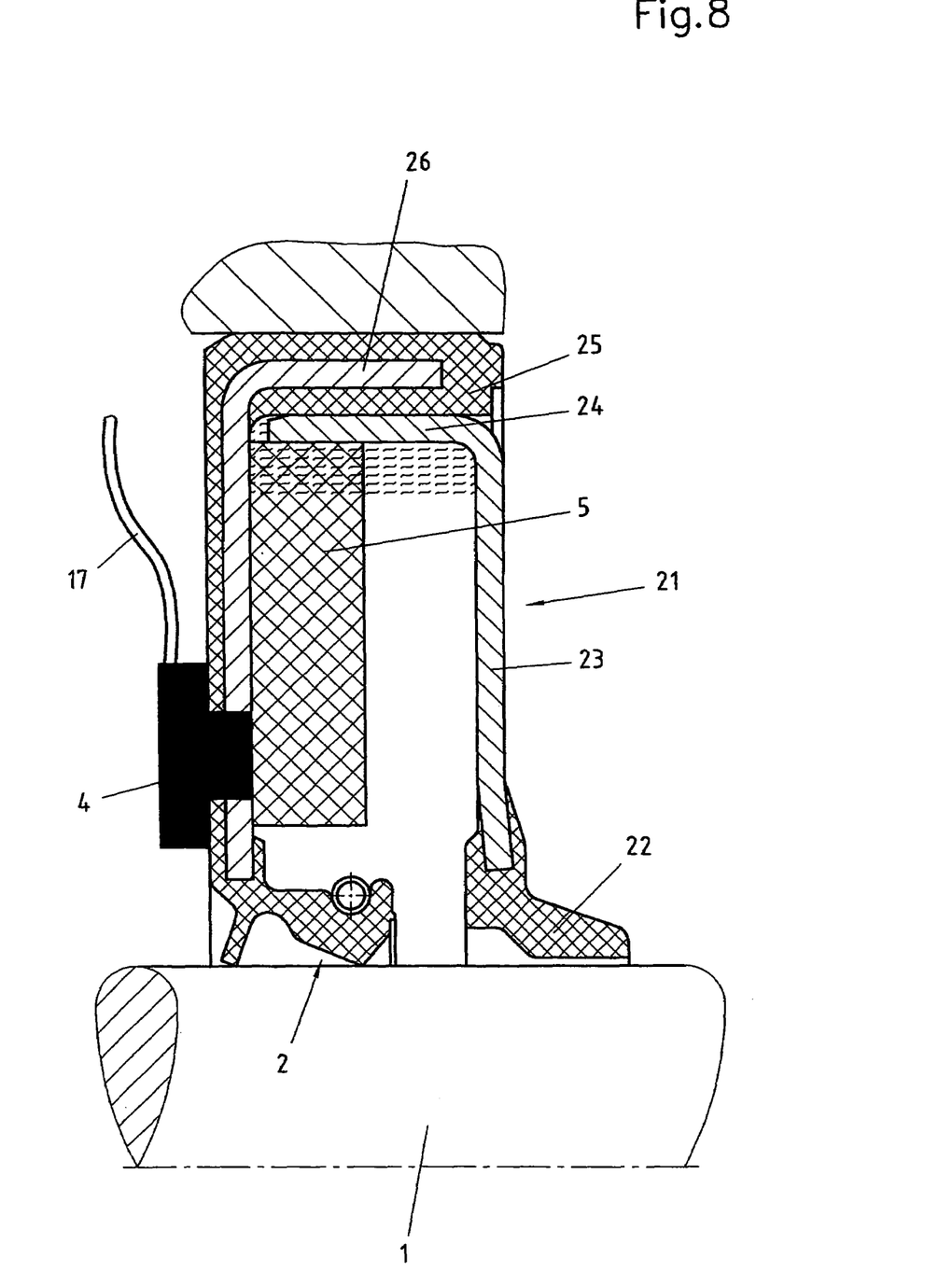
FIG. 8 shows a sealing arrangement with a disk for leak pickup and an external sensor according to a principle of the present invention.

FIG. 8 shows a sealing arrangement with a sealing ring 2 and a preliminary seal 21 that consists of a dust lip 22 and a supporting ring 23. An axial flange 24 of the supporting ring 23 of the preliminary seal 21 is inserted in a sealing manner into an elastomeric layer 25 of an axial flange 26 of the seal 2. In the space between sealing ring 2 and supporting ring 23 is disposed a depot 5. Sensor 4 is positioned on the side of the sealing ring 2 that faces the surroundings.

Figure 9:
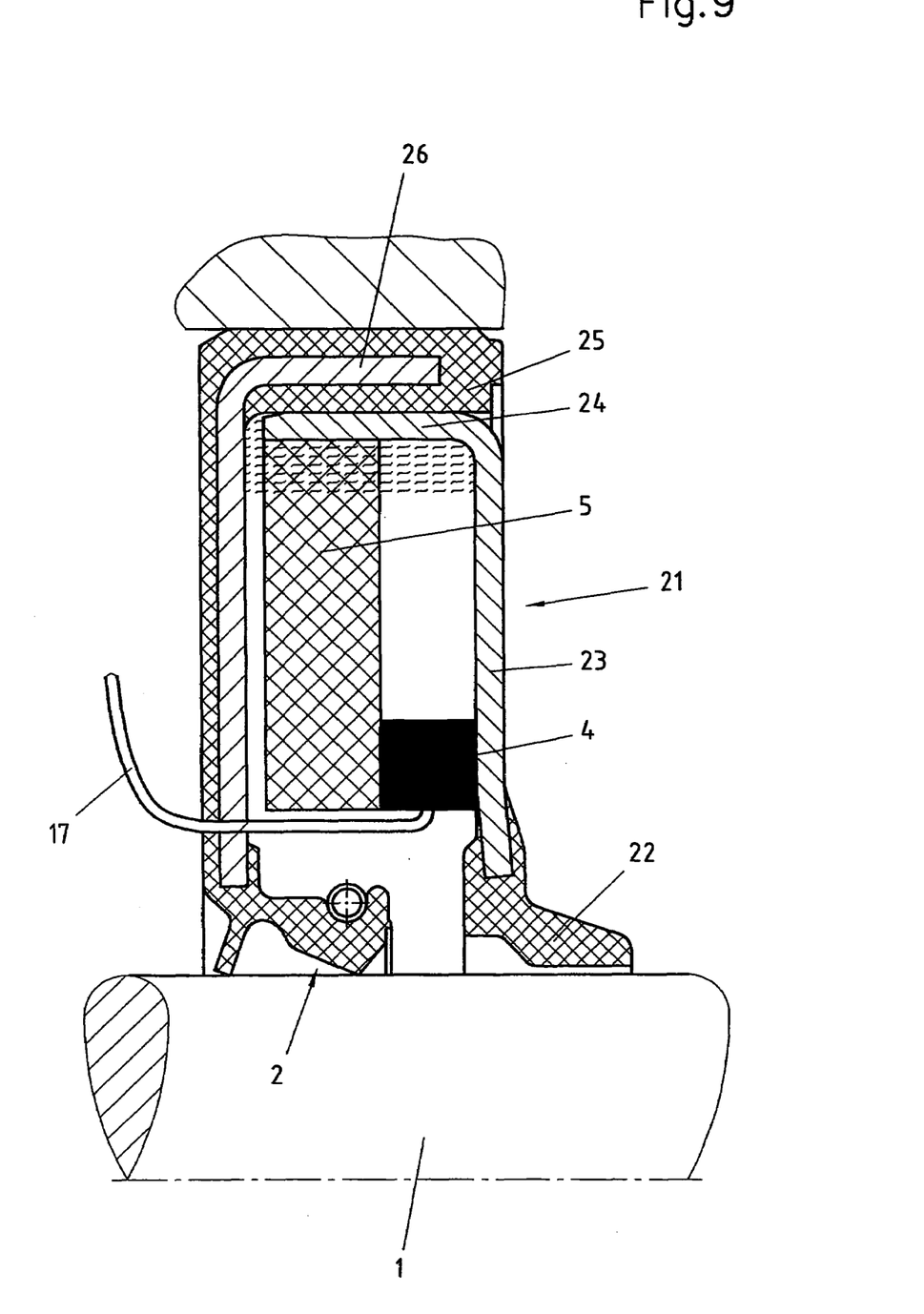
FIG. 9 shows a sealing arrangement with a disk for leak pickup and an internal sensor according to a principle of the present invention.

FIG. 9 shows a sealing arrangement as shown in FIG. 8, wherein sensor 4 is disposed in the space between sealing ring 2 and supporting ring 23.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sealing arrangement for sealing a machine element comprising:
    a support ring mounted to a housing;
    a sealing ring including a lip seal that contacts the machine element;
    a sensor for detecting a leak, said sensor mounted to at least one of said support ring and said sealing ring; and
    a depot for picking up the leak, said depot being disposed between said support ring and said sealing ring,
    wherein said depot is monitored by said sensor,
    said depot consists of an absorbent and/or swellable material, and
    said depot is arranged so that a delayed leak detection by the sensor is possible.

2. The sealing arrangement according to claim 1, wherein said depot is formed of an absorbent ring-shaped disk.

3. The sealing arrangement according to claim 1, wherein the depot comprises a nonvowen material.

4. The sealing arrangement according to claim 1, wherein said sensor is fastened on a carrier plate.

5. The sealing arrangement according to claim 1, wherein an annular disk is provided on a side of said sealing ring that faces its surroundings, said disk comprising an absorbent material and being positioned ahead of said leak-detection means.

6. The sealing arrangement according to claim 5, wherein said disk consists of a nonvowen material.

7. The sealing arrangement according to claim 1, wherein said sealing ring is inserted into said supporting ring.

8. The sealing arrangement according to claim 1, further comprising an elastomeric layer disposed on said supporting ring that has at least one sealing lip that rests on the machine element in a sealing manner or is disposed at a small distance therefrom.

9. The sealing arrangement according to claim 1, wherein said sensor detects optical changes of said depot.

10. The sealing arrangement according to claim 9, wherein said sensor consists of an reflected infrared light barrier.

11. The sealing arrangement according to claim 1, wherein a signal transmission from said sensor occurs through a round cable or a flat strip cable.

12. The sealing arrangement according to claim 1, wherein said supporting ring that is provided with, on an outer periphery of an axial leg, a layer of elastomer.

* * * * *